United States Patent
Zhao et al.

(10) Patent No.: US 9,560,361 B2
(45) Date of Patent: Jan. 31, 2017

(54) ADAPTIVE SINGLE-FIELD/DUAL-FIELD VIDEO ENCODING

(71) Applicants: Xu Gang Zhao, Maple (CA); Ying Li, Richmond Hill (CA)

(72) Inventors: Xu Gang Zhao, Maple (CA); Ying Li, Richmond Hill (CA)

(73) Assignee: VIXS SYSTEMS INC., Toronto (CA)

(*) Notice: Subject to any disclaimer, the term of this patent is extended or adjusted under 35 U.S.C. 154(b) by 456 days.

(21) Appl. No.: 13/705,422

(22) Filed: Dec. 5, 2012

(65) Prior Publication Data
US 2014/0153640 A1    Jun. 5, 2014

(51) Int. Cl.
| | |
|---|---|
| H04N 7/26 | (2006.01) |
| H04N 19/112 | (2014.01) |
| H04N 19/172 | (2014.01) |
| H04N 19/149 | (2014.01) |
| H04N 19/124 | (2014.01) |

(52) U.S. Cl.
CPC .......... H04N 19/112 (2014.11); H04N 19/149 (2014.11); H04N 19/172 (2014.11); H04N 19/124 (2014.11)

(58) Field of Classification Search
CPC ............................................... H04N 19/00018
USPC .................................................... 375/240.03
IPC ....................................................... H04N 7/14
See application file for complete search history.

(56) References Cited

U.S. PATENT DOCUMENTS

| | | |
|---|---|---|
| 5,486,863 A | 1/1996 | Auyenung et al. |
| 5,610,659 A | 3/1997 | Maturi et al. |
| 5,978,029 A | 11/1999 | Boice et al. |
| 6,223,193 B1 | 4/2001 | Pau et al. |
| 2002/0009148 A1* | 1/2002 | Nishio ...................... 375/240.25 |
| 2004/0255176 A1 | 12/2004 | George et al. |
| 2005/0053300 A1* | 3/2005 | Mukerjee ............. H04N 19/105 382/239 |
| 2005/0053302 A1* | 3/2005 | Srinivasan et al. ........... 382/248 |
| 2005/0084006 A1* | 4/2005 | Lei et al. ................... 375/240.1 |
| 2005/0111740 A1* | 5/2005 | Sakuyama .................... 382/232 |
| 2005/0152448 A1* | 7/2005 | Crinon et al. ........... 375/240.01 |
| 2010/0111161 A1 | 5/2010 | Ramachandran |
| 2010/0111162 A1 | 5/2010 | Ramachandran |
| 2011/0090956 A1* | 4/2011 | Youn ........................ 375/240.12 |
| 2011/0255594 A1* | 10/2011 | Nagori et al. ........... 375/240.03 |
| 2013/0107961 A1* | 5/2013 | Yamori .................... 375/240.16 |

OTHER PUBLICATIONS

U.S. Appl. No. 13/450,870, filed Apr. 19, 2012, Li et al., entitled "Detection of Video Feature Based on Variance Metric".

* cited by examiner

Primary Examiner — Yulin Sun

(57) ABSTRACT

A video processing device includes an interface to receive an input video stream and an interface to provide an encoded video stream. The input video stream includes a sequence of frames. Each frame comprises two fields. The video processing device further includes an encoder to encode the input video stream to generate the encoded video stream. The encoder is to dynamically switch between a first encoding mode and a second encoding mode responsive to a variable quantization parameter. In the first encoding mode the encoder is to encode both fields or the complete frame of a corresponding frame of the sequence. In the second encoding mode the encoder is to encode only one field of the two fields of a corresponding frame of the sequence. This approach can achieve a specified low bit rate with reduced quantization effects while keeping the horizontal resolution unchanged.

20 Claims, 3 Drawing Sheets

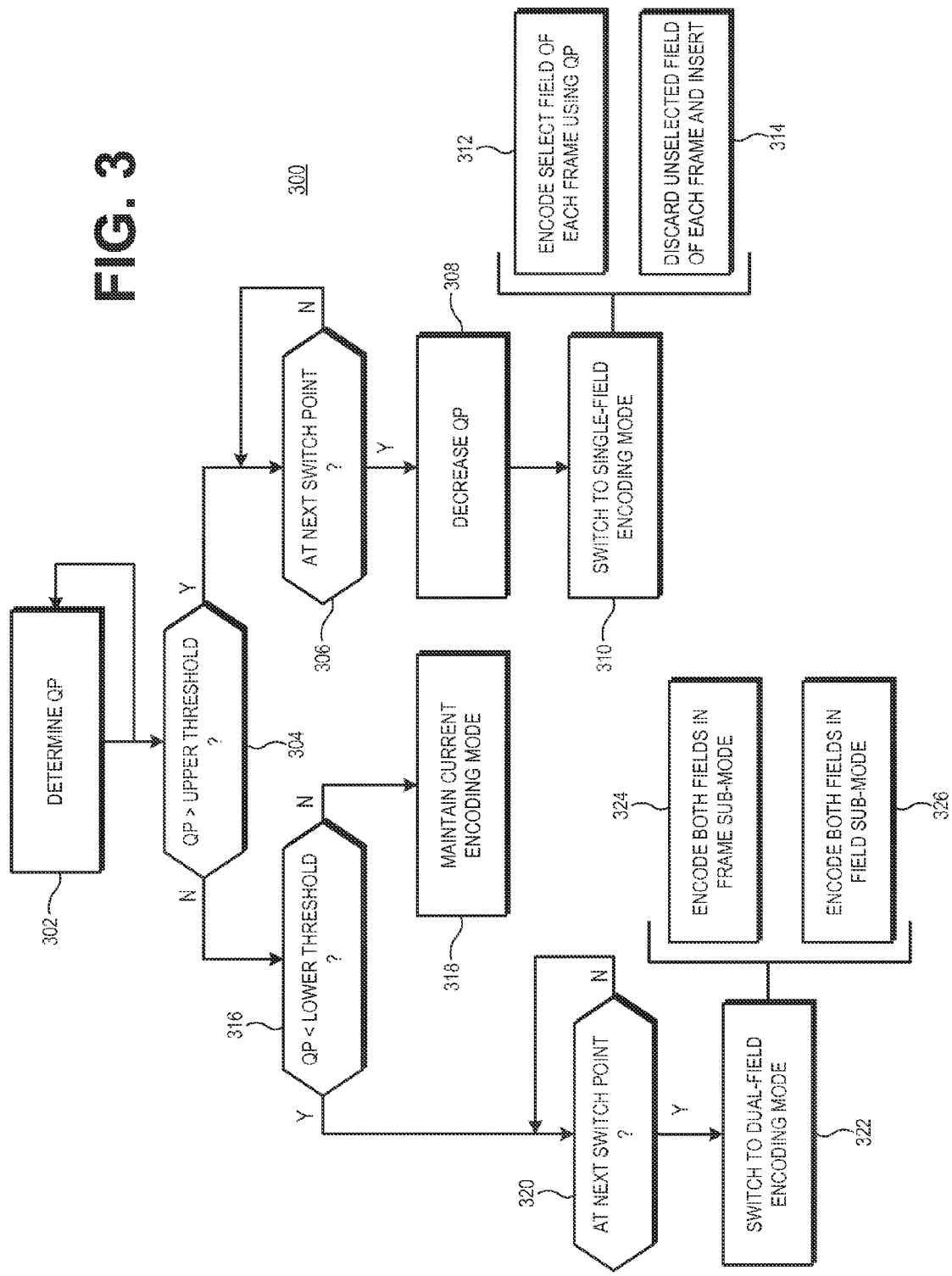

ADAPTIVE SINGLE-FIELD/DUAL-FIELD VIDEO ENCODING

FIELD OF THE DISCLOSURE

The present disclosure generally relates to video processing and more particularly relates to video encoding and transcoding.

BACKGROUND

Block-based video encoding techniques are inherently lossy as they rely on quality compromises in ways that are intended to be minimally perceptible. One such compromise comes in the form of the quantization parameter (QP), which controls the degree of quantization during encoding and thus controls the degree of spatial detail retained from the original video source. As QP increases, spatial detail is increasingly aggregated, which has the effect of lowering the bit rate at the expense of an increase in distortion and loss of quality. Rate control is frequently employed in video encoding or transcoding applications in an attempt to ensure that picture data being encoded meets various constraints, such as network bandwidth limitations, storage limitations, or processing bandwidth limitations, which may dynamically change. These constraints are reflected in the target bit rate for the resulting encoded video stream, and thus the goal of rate control is to maintain the bit rate of the encoded stream within a certain range of the target bit rate, which may remain relatively constant, as found in constant bit rate (CBR) applications, or may vary as found in variable bit rate (VBR) applications. Rate control achieves this target bit rate through manipulation of QP.

The high QP typically required to achieve relatively low bit rates in conventional encoding systems often introduces quantization artifacts that are readily perceivable by a viewer. In some systems, such quantization artifacts are addressed by lowering the temporal resolution or spatial resolution of the encoded stream, which often renders the artifacts unperceivable by the viewer. However, in certain video encoding standards, such as the Advanced Video Coding (AVC) standards, a change in resolution is treated as the starting of a new video stream, which prevents the use of reference video content before the resolution change and which requires new steam information. Moreover, the downstream device receiving the encoded video stream, which often is not under the control of the same entity controlling the encoder system, may not have the ability to, or be configured to, handle the resolution change. As such, an encoding system that facilitates low bit rates and allows the original resolution to be maintained while reducing the impact of quantization artifacts would be advantageous.

BRIEF DESCRIPTION OF THE DRAWINGS

The present disclosure may be better understood, and its numerous features and advantages made apparent to those skilled in the art by referencing the accompanying drawings.

FIG. 3 is a flow diagram illustrating a method for adaptive single-field/dual-field encoding in accordance with at least one embodiment of the present disclosure.

DETAILED DESCRIPTION

Figure 1:
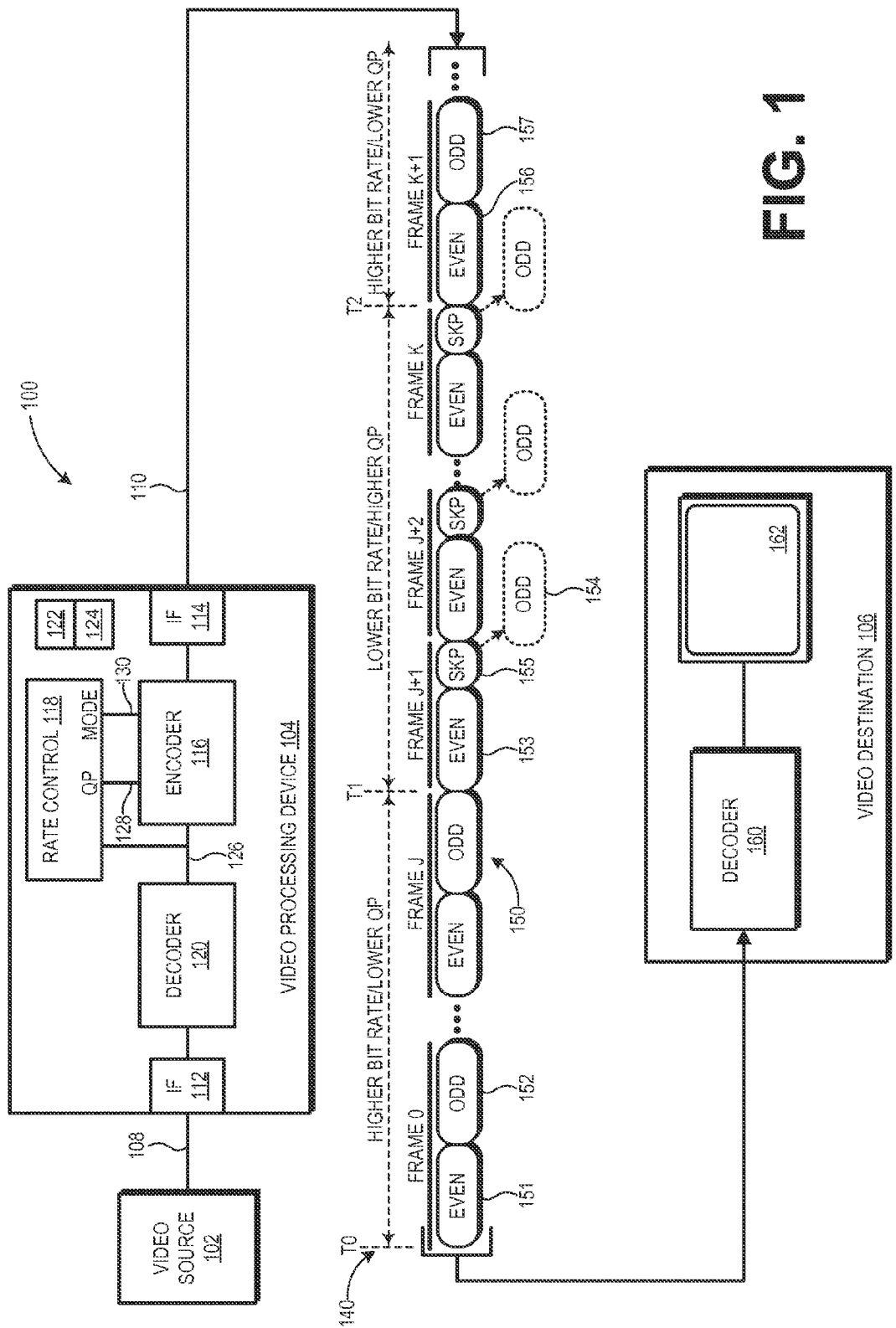
FIG. 1 is a block diagram illustrating a multimedia system employing adaptive single-field/dual-field encoding in accordance with at least one embodiment of the present disclosure.
Figure 2:
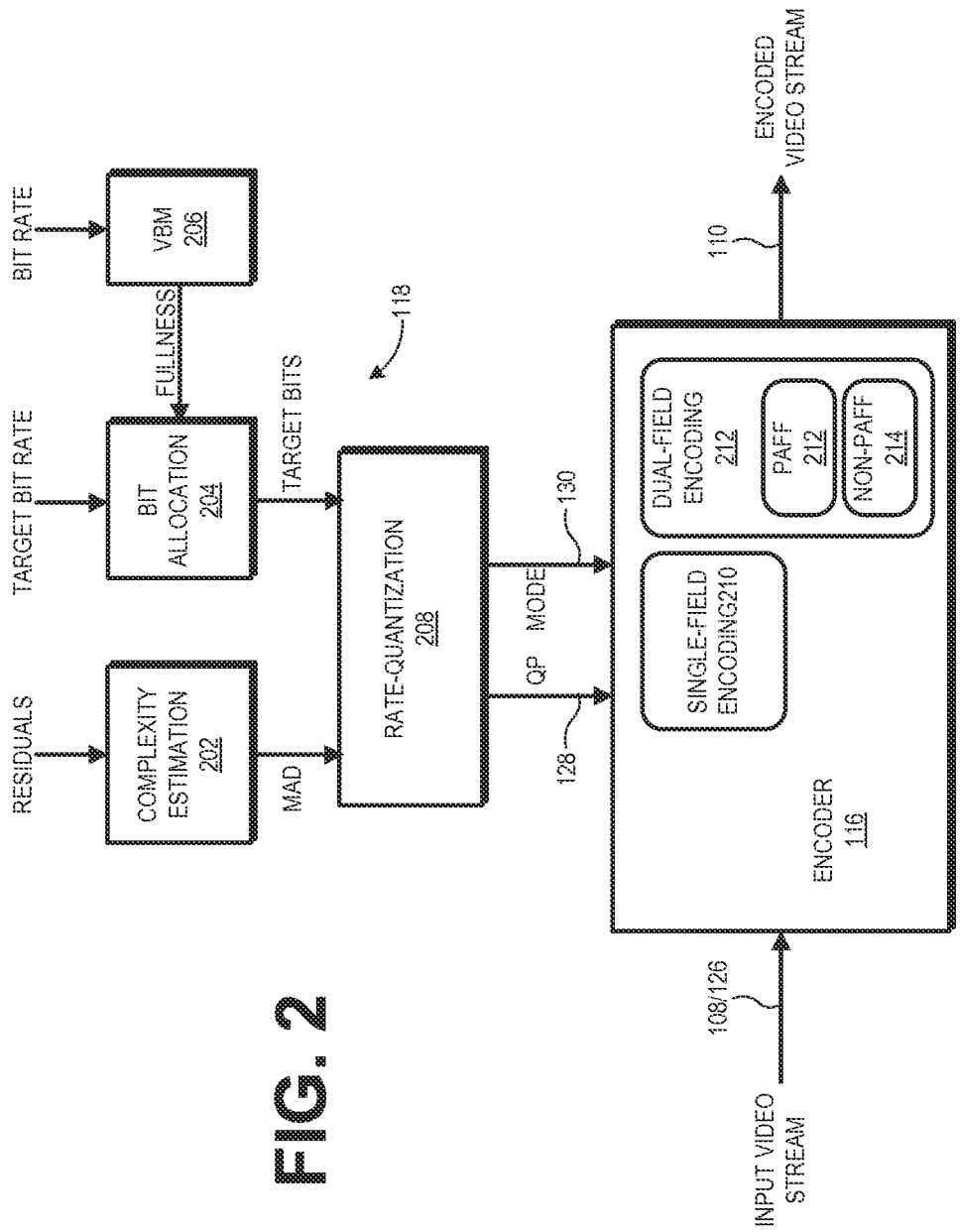
FIG. 2 is a block diagram illustrating an example configuration of a rate control module and an encoding module of the multimedia system of FIG. 1 in accordance with at least one embodiment of the present disclosure.

FIGS. 1-3 illustrate techniques for encoding or transcoding an input video stream by dynamically switching between a single-field encoding mode and a dual-field encoding mode based on one or more varying encoding parameters. A rate control module controls the encoding process so as to maintain the output bit rate of the resulting encoded video stream to within a certain range of a target bit rate, which may vary based on changing system constraints. As part of this process, the rate control module dynamically modifies the quantization parameter (QP) used in the quantization process based on modifications to the target bit rate. However, as a high QP can result in an unacceptable loss of spatial detail, the encoding process switches to the single-field encoding mode when the QP exceeds a specified threshold. In the single-field encoding mode, the picture data of only one of the two fields of each frame is encoded for inclusion in the resulting encoded video stream, and the picture data of the other field is processed in an all-skip mode that references the first field. When the QP falls below a specified threshold, the encoding process switches to the dual-field encoding mode, in which the picture data of both fields of each frame is encoded for inclusion in the resulting encoded video stream. Further, in some embodiments, the dual-field encoding mode can employ Picture Adaptive Frame Field (PAFF) encoding to encode both fields in a frame-based mode or in a field-based mode. Under this approach, very low bit rates for the encoded video stream can be achieved with reduced quantization artifacts while maintaining the original horizontal resolution of the encoded video stream.

For ease of illustration, the techniques of the present disclosure are described in the example context of the ITU-T H.264 encoding standards, which are also commonly referred to as the MPEG-4 Part 10 standards or the Advanced Video Coding (AVC) standards. However, the techniques of the present disclosure are not limited to this context, but instead may be implemented in any of a variety of block-based video compression techniques that employ field-based frames, examples of which include the MPEG-2 standards and the ITU-T H.263 standards.

FIG. 1 illustrates, in block diagram form, a multimedia system 100 in accordance with at least one embodiment of the present disclosure. The multimedia system 100 includes a video source 102, a video processing device 104, and a video destination 106. The multimedia system 100 can represent any of a variety of multimedia systems in which encoding or transcoding can be advantageously used. In one embodiment, the multimedia system 100 is a distributed television system whereby the video source 102 comprises a terrestrial, cable, or satellite television broadcaster, an over-the-top (OTT) multimedia source or other Internet-based multimedia source, and the like. In this implementation, the video processing device 104 and the video destination 106 together are implemented as user equipment, such as a set-top box, a tablet computer or personal computer, a computing-enabled cellular phone, and the like. Thus, the video processing device 104 encodes or transcodes an input video stream and the resulting encoded video stream is buffered or otherwise stored in a cache, memory, hard drive or other storage device (not shown) until it is accessed for decoding and display by the video destination

106. As another example, the multimedia system 100 can comprise a video content server system, whereby the video source 102 comprises one or more hard drives or other mass-storage devices storing original video content, the video destination 106 is a remote computer system connected to the video content server via a network, and the video processing device 104 is used to transcode the video content responsive to current network conditions before the transcoded video content is transmitted to the remote computer system via the network.

In operation, the video source 102 transmits or otherwise provides an input video stream 108 to the video processing device 104 in either an analog format, such as a National Television System Committee (NTSC) or Phase Alternating Line (PAL) format, or a digital format, such as an H.263 format, an H.264 format, a Moving Picture Experts Group (MPEG) format (such as MPEG1, MPEG-2 or MPEG4), Quicktime format, Real Media format, Windows Media Video (WMV) or Audio Video Interleave (AVI), or other digital video format, either standard or proprietary. In instances whereby the input video stream 108 has an analog format, the video processing device 104 operates to encode the input video stream 108 to generate an encoded video stream 110, and in instances whereby the input video stream 108 has a digital format, the video processing device 104 operates to transcode the input video stream 108 to generate the encoded video stream 110. The resulting encoded video stream 110 is transmitted to the video destination 106 for storage, decoding, display, and the like.

In the illustrated embodiment, the video processing device 104 includes interfaces 112 and 114, an encoder 116, a rate control module 118, and, in instances whereby the video processing device 104 provides transcoding, a decoder 120. The interfaces 112 and 114 include interfaces used to communicate signaling with the video source 102 and the video destination 106, respectively. Examples of the interfaces 112 and 114 include input/output (I/O) interfaces, such as Peripheral Component Interconnect Express (PCIE), Universal Serial Bus (USB), Serial Attached Technology Attachment (SATA), wired network interfaces such as Ethernet, or wireless network interfaces, such as IEEE 802.11x or Bluetooth™ or a wireless cellular interface, such as a 3GPP, 4G, or LTE cellular data standard. The decoder 120, the encoder 116, and rate control module 118 each may be implemented entirely in hard-coded logic (that is, hardware), as the combination of software stored in a memory 122 and a processor 124 to access and execute the software, or as combination of hard-coded logic and software-executed functionality. To illustrate, in one embodiment, the video processing device 104 is implemented as a SOC whereby portions of the decoder 120, the encoder 116, and the rate control module 118 are implemented as hardware logic, and other portions are implemented via firmware stored at the SOC and executed by a processor of the SOC.

The hardware of the video processing device 104 can be implemented using a single processing device or a plurality of processing devices. Such processing devices can include a central processing unit (CPU), a graphics processing unit (GPU), a microcontroller, a digital signal processor, a field programmable gate array, programmable logic device, state machine, logic circuitry, analog circuitry, digital circuitry, or any device that manipulates signals (analog and/or digital) based on operational instructions that are stored in a memory, such as the memory 122. The memory 122 may be a single memory device or a plurality of memory devices. Such memory devices can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

In a transcoding mode, the decoder 120 operates to receive the input video stream 108 via the interface 112 and partially or fully decode the input video stream 108 to create a decoded data stream 126, which can include pixel information, motion estimation/detection information, timing information, and other video parameters. The encoder 116 receives the decoded data stream 126 and uses the video parameters represented by the decoded data stream to generate the encoded video stream 110, which comprises a transcoded representation of the video content of the original input video stream 108. The transcoding process implemented by the encoder 116 can include, for example, a stream format change (e.g., conversion from an MPEG-2 format to an AVC format), a resolution change, a frame rate change, a bit rate change, and the like. In an encoding mode, the decoder 120 is bypassed and the input video stream 108 is digitized and then encoded by the encoder 116 to generate the encoded video stream 110.

Video encoding schemes generally process frames as rows, or horizontal scan lines, of picture elements ("pixels"). Each frame comprises an "even" field composed of the even numbered rows of the frame, such as rows 0, 2, 4, etc., and an "odd" field composed of the odd numbered rows of the frame, such as rows 1, 3, 5, etc. Thus, the odd and even fields are interleaved with respect to a given frame. The even field and odd field are also known as the "top" field and "bottom" field, respectively. A progressive display is configured to concurrently display both the even field and the odd field of a frame, whereas an interlaced display is configured to display the two fields of a frame in sequence. Similarly, progressive encoding is configured to encode a frame using both fields, whereas interlaced encoding separately encodes the fields.

In at least one embodiment, the encoder 116 leverages this dual-field representation of frames by employing at least two encoding modes, including a dual-field encoding mode and a single-field encoding mode for encoding the sequence of frames represented by the input video stream 108. In the dual-field encoding mode, the encoder 116 encodes both the even field and the odd field of a frame so that the picture content of both the even field and the odd field is represented, in compressed form, in the encoded video stream 110. As part of this dual-field encoding mode, the encoder 116 can employ Picture Adaptive Frame Field (PAFF) encoding as found in, for example, the MPEG-4 AVC standard. PAFF encoding enables a frame to be encoded as either interlaced (e.g., each field separately encoded) or progressive (the two fields encoded together) based on a motion analysis between the two fields of the frame. In the single-field encoding mode, the encoder 116 encodes only a single field of each frame so that the picture content of only one field of each frame is represented in the encoded video stream. The picture content of other field of the frame is disregarded by the encoder 116, which may instead insert skip information into the encoded video stream 110 in place of the other field, whereby the skip information references the field that was encoded. This approach halves the vertical resolution of the frame while maintaining the same horizontal resolution. As such, the single-field encoding mode can achieve a substantially lower bit rate compared to the dual-field encoding mode while maintaining the same horizontal resolution.

The rate control module 118 dynamically determines and adjusts various encoding parameters used by the encoder 116 to achieve a target bit rate. In one embodiment, these encoding parameters include a control signal 128 (denoted "QP" in FIG. 1) to set the QP used during by quantization process of the encoder 116, as well as a control signal 130 (denoted "MODE" in FIG. 1) to select which of the two encoding modes is to be employed by the encoder 116. As described in greater detail below with reference to FIG. 2, the rate control module 118 continuously monitors the complexity of the pictures to be encoded, the bits allocated to encode the pictures, and a specified target bit rate (which may be constant or may vary with, for example, changing network bandwidth parameters) to determine the next value for QP and signals this new QP value via control signal 128.

Generally, as QP increases, the degree of quantization implemented by the encoder 116 increases, which results in a lower degree of spatial resolution retained in the resulting encoded picture content, and vice versa. However, at very low target bit rates, the very high QP that might otherwise result can significantly degrade the quality of the resulting encoded picture content. Accordingly, in at least one embodiment, the rate control module 118 uses the QP to adaptively select the mode to be employed by the encoder 116. While the QP is within a range deemed acceptable, the rate control module 118 configures the control signal 130 to place the encoder 116 in the dual-field encoding mode so that both fields of each frame being processed are encoded for inclusion in the encoded video stream 110. However, when the QP is deemed to be excessively high (that is, at a level deemed to result in an unacceptable reduction in quality), the rate control module 118 configures the control signal 130 to switch the encoder 116 into the single-field encoding mode so that only a single field of each frame being process is encoded for inclusion in the encoded video stream 110. As single-field encoding mode reduces the vertical picture information that needs to be encoded for each frame, and thus reduces the amount of data needed to represent the frame in the encoded video stream 110, the rate control module 118 can also decrease the QP to take advantage of the additional bit rate headroom made available. Thus, the single-field encoding mode allows the encoder 116 to achieve the target bit rate with a lower QP and the same horizontal resolution, which typically facilitates a higher quality decoded video compared to a conventional process whereby a higher QP is employed while including both fields of the frame in the encoded video stream.

To illustrate, FIG. 1 also depicts a timeline 140 for an example portion 150 of the encoded video stream 110 to illustrate the dynamic switching between the dual-field encoding mode and the single-field encoding mode. At time T0 encoding conditions permit a higher target bit rate and lower QP, and thus the rate control module 118 configures the encoder 116 to switch to the dual-field encoding mode. While in this dual-field encoding mode, the encoder 116 encodes frames of a subsequence of the frames of the input video stream 108 to include the picture content of both the even and odd fields of each frame. For example, frame 0 is encoded to include the picture content of the even field 151 and the bottom field 152 of frame 0 in the encoded video stream 110, and this process continues for each frame up through frame J at time T1.

Between time T0 and time T1, the rate control module 118 increases QP based on any of a variety of factors, such as increasing image complexity, decreasing target bit rate, etc. By time T1, QP has been increased to the point that it exceeds a specified threshold, and thus at time T1 the rate control module 118 configures the encoder 116 to switch to the single-field encoding mode. Moreover, with the additional bit rate headroom cleared by switching to the single-field encoding mode, the rate control module 118 decreases QP. While in the single-field encoding mode, the encoder 116 encodes frames of a subsequence of frames to include the picture content of only the even field of each frame. For example, the frame J+1 processed after time t1 is encoded to include the picture content of the even field 153 in the encoded video stream 110, while the picture content of the bottom field 154 of frame J+1 is disregarded. Thus, skip information 155 is included in the encoded video stream 110 in place of what would have been the encoded picture content of the bottom field 154. Rather than including picture content, this skip information 155 specifies an all-skip mode (that is, sets each macroblock (MB) in the bottom field 154 to skip mode) and references the even field 153 of the same frame. Alternatively, the odd field can be encoded and the even field disregarded during the single-field encoding mode. The single-field encoding process continues for each frame up through frame K at time T2.

Between time T1 and time T2, the rate control module 118 decreases QP based on various factors, such as decreasing image complexity, increasing target bit rate, etc. By time T2, QP has been decreased to the point that it falls below a specified threshold, and thus at time T2 the rate control module 118 configures the encoder 116 to switch back to the dual-field encoding mode. As with before, while in the dual-field encoding mode the encoder 116 encodes frames of a subsequence of frames to include the picture content of both the even and odd fields of each frame, such as by encoding the picture content of both the even field 156 and the odd field 157 in the encoded video stream 110 of a frame K+1 processed after time T2.

In some implementations, the threshold used to trigger the switch from the dual-field encoding mode to the single-field encoding mode can be the same threshold as that used to trigger the switch from the single-field encoding mode to the dual-field encoding mode. However, this can lead to frequent switching between the two encoding modes. To reduce or eliminate perceptible quality deviations resulting from frequent switching between the dual-field encoding mode and single-field encoding mode, a directional switch with two thresholds may be employed. For example, the QP threshold used to initiate a switch from the dual-field encoding mode to the single-field encoding mode may be higher than the QP threshold used to initiate a switch from the single-field encoding mode to the dual-field encoding mode. Moreover, the rate control module 118 can control the toggling frequency between modes to a degree by delaying a switch between modes be delayed until a specified switch point occurs or by implementing a minimum distance condition between mode switch points. Such switch points can include, for example, scene, group of picture (GOP), or mini-GOP boundaries. The minimum distance condition can be specified as, for example, a minimum number of GOPs, mini-GOPs, or scene changes since the previous switch, a minimum lapse of time since the previous switch, and the like.

As noted above, the video destination 106 can operate to decode and display the encoded video stream 110. To this end, the video destination 106 includes a decoder 160 and a display device 162. The decoder 160 operates to decode the encoded video stream 110 to generate a decoded video stream and then provide this decoded video stream to the display device 162. For those frames of a subsequence encoded under the dual-field encoding mode, such as frames 0, J, and K+1, the decoder 160 decodes the picture content of both the even field and the odd field of the frame from the encoded video stream 110 and displays the resulting decoded representation of the picture content of both fields either concurrently for a progressive display or in sequence for an interlaced display. For those frames of a subsequence encoded under the single-field encoding mode, such as frames J+1, J+2, and K, the same decoding process may be used under conventional conditions, although the video content of the omitted field will not be present in the decoded result.

FIG. 2 illustrates an example implementation of the rate control module 118 in greater detail in accordance with at least one embodiment of the present disclosure. In the depicted example, the rate control module 118 includes a complexity estimation module 202, a bit allocation module 204, a virtual buffer model (VBM) 206, and a rate-quantization module 208.

In operation, the encoder 116 employs a subtraction process and motion estimation process for data representing macroblocks of pixel values for a picture to be encoded. The motion estimation process compares each of these new macroblocks with macroblocks in a previously stored reference picture or pictures to find the macroblock in a reference picture that most closely matches the new macroblock. The motion estimation process then calculates a motion vector, which represents the horizontal and vertical displacement from the macroblock being encoded to the matching macroblock-sized area in the reference picture. The motion estimation process also provides this matching macroblock (known as a predicted macroblock) out of the reference picture memory to the subtraction process, whereby it is subtracted, on a pixel-by-pixel basis, from the new macroblock entering the encoder. This forms an error prediction, or "residual", that represents the difference between the predicted macroblock and the actual macroblock being encoded. The encoder 116 employs a two-dimensional (2D) discrete cosine transform (DCT) to transform the residual from the spatial domain. The resulting DCT coefficients of the residual are then quantized using the QP so as to reduce the number of bits needed to represent each coefficient. The quantized DCT coefficients then may be Huffman run/level coded to further reduces the average number of bits per coefficient. This is combined with motion vector data and other side information (including an indication of I, P or B pictures) for insertion into the encoded video stream 110.

For the case of P pictures, the quantized DCT coefficients also go to an internal loop that represents the operation of the decoder (a decoder within the encoder). The residual is inverse quantized and inverse DCT transformed. The predicted macroblock is read out of the reference picture memory is added back to the residual on a pixel by pixel basis and stored back into a memory to serve as a reference for predicting subsequent pictures. The encoding of I pictures uses the same process, except that no motion estimation occurs and the negative (−) input to the subtraction process is forced to 0. In this case the quantized DCT coefficients represent transformed pixel values rather than residual values as was the case for P and B pictures. As is the case for P pictures, decoded I pictures are stored as reference pictures.

The rate-quantization module 208 uses the image complexity and bit allocations as parameters for determining the QP, which in turn determines the degree of quantization performed by the encoder 116 and thus influences the bit rate of the resulting encoded video data. In one embodiment, the image complexity is estimated by the complexity estimation module 202, which calculates a mean average difference (MAD) of the residuals as an estimate of image complexity for picture data to be encoded. The MAD may be calculated using any of a variety of well-known algorithms. The bit allocations are represented by target numbers of bits that may be allocated at different granularities, such as per frame, picture, GOP, slice, or block. In one embodiment, the VBM 206 maintains a model of the buffer fullness of a modeled decoder receiving the encoded video stream 110 and the bit allocation module 204 determines the number of target bits to allocate based on the buffer fullness and a specified target bit rate, which can include a specific bit rate or a bit rate range, using any of a variety of well-known bit allocation algorithms.

The rate-quantization module 208 uses the calculated MAD and the target bit allocation to calculate a value for QP that is expected to achieve the target bit rate when used to encode the picture data having the calculated MAD and target bit allocation. Any of a variety of well-known QP calculation techniques may be used to determine the value for QP. Moreover, the rate-quantization module 208 may employ a QP limiter to dampen any rapid changes in the QP value so as to provide stability and minimize perceptible variations in quality. The revised QP value is signaled to the encoder 116 via the control signal 128.

Moreover, as noted above, the rate-quantization module 208 uses the relationship between QP and one or more specified thresholds to switch the encoder 116 between a single-field encoding mode (denoted as mode 210 in FIG. 2) and a dual-field encoding mode (denoted as mode 212 in FIG. 2) via the control signal 130. These specified thresholds may be programmed via software-observable registers or pre-configured via a read-only memory (ROM), fuses, or one-time-programmable (OTP) registers, and the like. Moreover, the rate-quantization module 208 can use the control signal 130 to specify whether the encoder 116 is to employ PAFF in a PAFF sub-mode (denoted as sub-mode 214 in FIG. 2) or bypass PAFF in a non-PAFF sub-mode (denoted as sub-mode 216 in FIG. 2) while the encoder 116 is in the dual-field encoding mode.

In the event that the rate-quantization module 208 determines to switch from the dual-field encoding mode to the single-field encoding mode responsive to the QP exceeding an upper threshold, the rate-quantization module 208 is configured to reduce the QP to take advantage of the bit rate headroom created by application of the single-field encoding mode to the encoded video stream 110. In one embodiment, the rate-quantization module 208 implements a fixed reduction to the QP upon switching to the single-field encoding mode. In other embodiments, the one or both of the MAD and the target bit allocation are updated to reflect that only one of the two fields of each frame is to be encoded, and the rate-quantization module 208 updates QP based on these updated input parameters. Thus, the rate-quantization module 208 can control the encoder 116 through the QP value and the encoding mode so as to provide more optimal video quality at the original horizontal resolution while also meeting very low target bit rates.

FIG. 3 illustrates an example method 300 for setting the encoding parameters of the encoder 116 of the video processing device 104 of FIGS. 1 and 2. Upon receiving the input video stream 108 at the video processing device 104 from the video source 102, the video processing device 104 initiates an encoding process using the encoder 116 to either encode or transcode the input video stream 108. Accordingly, at block 302 the rate-quantization module 208 determines encoding parameters for the encoder 116, including the QP to be implemented for the quantization process employed by the encoder 116, based on various parameters, including image complexity and target bit allocations. This process is repeated continuously to update QP based on dynamically changing parameters.

With the QP determined, the rate-quantization module 208 then turns to determining which encoding mode is to be employed by the encoder 116 based on the QP. Accordingly, at block 304 the rate-quantization module 208 compares the QP with a specified upper threshold to determine whether the QP is excessively high, and thus likely to significantly impact video quality. Accordingly, if the QP exceeds the upper threshold, the rate-quantization module 208 prepares to switch to the single-field encoding mode. To this end, at block 306 the rate-quantization module 208 delays the switch until the next encountered switch point. As noted above, the switch points can include, for example, scene, GOP, or mini-GOP boundaries, and a minimum distance condition may be instituted between mode switches. Once the next switch point is encountered and the minimum distance condition from the previous switch is satisfied, at block 308 the rate-quantization module 208 decreases QP either by a fixed step or based on a recalculation of QP in view of the reduced image complexity and increased target bit rate allocation that will occur in the single-field encoding mode. The rate-quantization module 208 then uses the control signal 130 to configure the encoder 116 to the single-field encoder mode at block 310. As described above, while in the single-field encoder mode, the encoder 116 encodes the picture data of a select one of the two fields using the QP and includes the encoded picture data in the encoded video stream 110 at block 312 and discards or otherwise disregards the picture data of the non-selected one of the two fields at block 314.

Returning to block 304, if the QP does not exceed the upper threshold, at block 316 the rate-quantization module 208 determines whether the QP falls below a specified lower threshold. If the QP is between the lower threshold and the upper threshold, at block 318 the rate-quantization module 208 maintains the encoder 116 in its current encoding mode. Otherwise, if the QP is below the lower threshold, the rate-quantization module 208 prepares to switch the encoder 116 to the dual-field encoding mode. Accordingly, at block 320 the rate-quantization module 208 delays the switch until the next switch point is encountered and any minimum distance condition is met. Thereafter, at block 322 the rate-quantization module 208 reconfigures the encoder 116 to switch to the dual-field encoding mode and the rate-quantization module 208 increases QP either by a fixed step or based on a recalculation of QP in a similar manner as described above with reference to block 308. As noted above, while in the dual-field encoding mode, the encoder 116 encodes both fields of each frame of the frame subsequence being processed while in the dual-field encoding mode. The dual-field encoding mode may employ PAFF such that the motion between fields of a frame or other measure of complexity is used to determine whether to encode both fields of a frame together in a frame-based encoding mode at block 324, or to encode each field separately in a field-based encoding mode at block 326.

The QP is continuously updated at block 302 based on dynamic changes in the parameters used to calculate QP, such as the complexity of the particular pictures to be encoded, fluctuations in the target bit rate (due to, for example, fluctuations in the bandwidth of a network link), and the like. The video processing device 104 can repeat the process represented by blocks 304-326 based on the updated QP so as to dynamically adapt the encoder 116 to varying encoding limitations while attempting to maintain the original horizontal resolution in a manner that provides high video quality at lower bit rates.

In this document, relational terms such as "first" and "second", and the like, may be used solely to distinguish one entity or action from another entity or action without necessarily requiring or implying any actual relationship or order between such entities or actions or any actual relationship or order between such entities and claimed elements. The term "another", as used herein, is defined as at least a second or more. The terms "including", "having", or any variation thereof, as used herein, are defined as comprising.

Other embodiments, uses, and advantages of the disclosure will be apparent to those skilled in the art from consideration of the specification and practice of the disclosure disclosed herein. The specification and drawings should be considered as examples only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:
1. A method comprising:
  encoding an input video stream at a video processing device based on a variable quantization parameter to generate an encoded video stream, the input video stream comprising a sequence of frames, each frame representing a single picture comprising two fields: an odd field having the odd numbered rows of the picture and an even field having the even numbered rows of the picture, wherein the encoding comprises:
    encoding only one field of the two fields of each frame of a first subsequence of the sequence of frames for the encoded video stream responsive to the quantization parameter exceeding a first threshold.

2. The method of claim 1, wherein encoding only one of the two fields of each frame of the first subsequence comprises:
- encoding picture data of a first field of each frame of the first subsequence to generate encoded picture data for inclusion in the encoded video stream; and
- inserting skip coding information into the encoded video stream in place of encoded picture data for a second field of each frame of the first subsequence.

3. The method of claim 2, further comprising:
decoding the encoded video stream, wherein the decoding includes:
- decoding the encoded picture data to generate a decoded representation of the first field of each frame of the first subsequence; and
- replicating the decoded representation of the first field of each frame as a decoded representation of the second field of the frame.

4. The method of claim 1, wherein the encoding further comprises:
- encoding both fields of each frame of a second subsequence of the sequence of frames for the encoded video stream responsive to the quantization parameter falling below a second threshold.

5. The method of claim 4, wherein the first threshold and the second threshold are the same threshold.

6. The method of claim 4, wherein the first threshold is greater than the second threshold.

7. The method of claim 4, wherein encoding both fields of each frame comprises encoding both fields using picture adaptive frame field (PAFF) encoding.

8. A method of encoding an input video stream, the method comprising:
dynamically switching between a first encoding mode and a second encoding mode at a video processing device responsive to a variable quantization parameter, wherein:
- the input video stream comprises a sequence of frames, each frame representing a corresponding single picture comprising two fields: an odd field having the odd numbered rows of the picture and an even field having the even numbered rows of the picture;
- the first encoding mode comprises encoding both fields of a corresponding frame of the sequence; and
- the second encoding mode comprises encoding only one field of the two fields of a corresponding frame of the sequence.

9. The method of claim 8, wherein dynamically switching between the first encoding mode and the second encoding mode comprises:
- switching to the second encoding mode at the video processing device responsive to the quantization parameter exceeding a first threshold.

10. The method of claim 9, wherein dynamically switching between the first encoding mode and the second encoding mode further comprises:
- switching to the first encoding mode at the video processing device responsive to the quantization parameter falling below a second threshold.

11. The method of claim 8, wherein the first encoding mode further comprises selecting between a frame-based encoding sub-mode and a field-based encoding sub-mode for a corresponding frame based on a motion analysis between the two fields of the corresponding frame.

12. The method of claim 8, wherein dynamically switching between the first encoding mode and the second encoding mode comprises delaying a switch between the first encoding mode and the second encoding mode at the video processing device until a specified switch point.

13. The method of claim 12, wherein the specified switch point comprises at least one selected from a group consisting of: a scene boundary; a group of pictures (GOP) boundary; a miniGOP boundary; and a minimum distance condition from a previous switch between the first encoding mode and the second encoding mode.

14. The method of claim 8, further comprising:
- decreasing the quantization parameter responsive to switching to the second encoding mode.

15. A video processing device comprising:
- an interface to receive an input video stream, the input video stream comprising a sequence of frames, each frame representing a corresponding single picture comprising two fields: an odd field having the odd numbered rows of the picture and an even field having the even numbered rows of the picture; and
- an encoder to encode the input video stream to generate an encoded video stream, wherein the encoder is to dynamically switch between a first encoding mode and a second encoding mode responsive to a variable quantization parameter, wherein:
  - in the first encoding mode the encoder is to encode both fields of a corresponding frame of the sequence; and
  - in the second encoding mode the encoder is to encode only one field of the two fields of a corresponding frame of the sequence.

16. The video processing device of claim 15, wherein the encoder is to dynamically switch between the first encoding mode and the second encoding mode by switching to the second encoding mode responsive to the quantization parameter exceeding a first threshold.

17. The video processing device of claim 16, wherein the encoder is to dynamically switch between the first encoding mode and the second encoding mode further by switching to the first encoding mode responsive to the quantization parameter falling below a second threshold.

18. The video processing device of claim 15, wherein in the first encoding mode the encoder further is to select between a frame-based encoding sub-mode and a field-based encoding sub-mode for a corresponding frame based on a motion analysis between the two fields of the corresponding frame.

19. The video processing device of claim 15, wherein the encoder is to delay a switch between the first encoding mode and the second encoding mode until a specified switch point.

20. The video processing device of claim 15, wherein the encoder further is to decrease the quantization parameter responsive to switching to the second encoding mode.

* * * * *